Figures 1, 2:
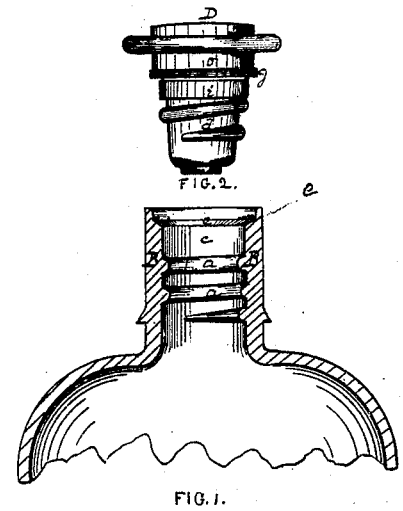

H. FRANK.

Bottle-Stoppers.

No. 130,208.

Patented Aug. 6, 1872.

WITNESSES.

R. C. Wrenshall
James I. Kay

INVENTOR.

Himan Frank,
by Bakewell, Christy & Kerr,
his Attys.

UNITED STATES PATENT OFFICE.

HIMAN FRANK, OF PITTSBURG, PENNSYLVANIA.

IMPROVEMENT IN BOTTLE-STOPPERS.

Specification forming part of Letters Patent No. 130,208, dated August 6, 1872.

SPECIFICATION.

*To all whom it may concern:*

Be it known that I, HIMAN FRANK, of Pittsburg, in the county of Allegheny and State of Pennsylvania, have invented a new and useful Improvement in Bottle-Stopper; and I do hereby declare the following to be a full, clear, and exact description thereof, reference being had to the accompanying drawing making part of this specification, in which—

Figure 1 is a vertical sectional view of a bottle-mouth illustrating my improvement, and Fig. 2 is a side view of the stopper with the gasket in section.

Like letters of reference denote like parts in each.

To enable others skilled in the art to make and use my invention, I will proceed to describe its construction and mode of operation.

The tool by which the bottle or jar mouth is formed constitutes the subject-matter of a separate application. By it a pair of jaws engage the outside of the neck B; a threaded plug enters the mouth so as to form the internal screw-thread $a$; a ring or collar above the threaded part of the plug forms a cylindrical part, $c$, of a diameter at least equal to the diameter of the bottoms of the screw-thread cavities or grooves below; a fillet above the ring forms a bevel, $e$, immediately around the inside mouth, and a flat plate finishes the end.

In connection with such a bottle or jar mouth I use a stopper, D, having a threaded end, $d$, a cylindrical part, $i$, just above, of suitable size to fill neatly the part $c$ of the bottle mouth; an annular groove above that in which to place a gasket, $g$, with a part, $o$, just above, of as great diameter as the outer periphery of the gasket, so that when the stopper is inserted, the lower outer edge of the gasket will be compressed onto and made to bear tightly on the bevel seat $e$ of Fig. 1. The cylindrical part $i$, filling the cavity $c$, prevents the contents of the jar or bottle from coming in contact with the gasket above.

I am aware that jars have been made with an internal screw-thread immediately below a square gasket-seat. I claim that the beveled seat is better. The gasket is compressed on an inclined surface or forced inward as well as downward, so as to give a tighter joint with the same pressure.

What I claim as my invention, and desire to secure by Letters Patent, is—

1. A bottle or jar neck, having a beveled gasket-seat, $e$, and screw-thread, $a$, below, with the cylindrical part $c$ between, substantially as set forth.

2. A stopper suitable for use with the bottle or jar mouth of Fig. 1, such stopper having a threaded end, $d$, a cylindrical part, $i$, a gasket, $g$, with overhanging top $o$, substantially as described.

In testimony whereof I, the said HIMAN FRANK, have hereunto set my hand.

HIMAN FRANK.

Witnesses:
A. S. NICHOLSON,
G. H. CHRISTY.